US009851723B2

(12) United States Patent
Builta

(10) Patent No.: US 9,851,723 B2
(45) Date of Patent: Dec. 26, 2017

(54) METHOD AND APPARATUS FOR FLIGHT CONTROL OF TILTROTOR AIRCRAFT

(75) Inventor: Kenneth E. Builta, Euless, TX (US)

(73) Assignee: Textron Innovations Inc., Providence, RI (US)

(*) Notice: Subject to any disclaimer, the term of this patent is extended or adjusted under 35 U.S.C. 154(b) by 1095 days.

(21) Appl. No.: 11/631,696

(22) PCT Filed: Jul. 29, 2004

(86) PCT No.: PCT/US2004/024431
§ 371 (c)(1),
(2), (4) Date: Jan. 5, 2007

(87) PCT Pub. No.: WO2006/022654
PCT Pub. Date: Mar. 2, 2006

(65) Prior Publication Data
US 2007/0221780 A1    Sep. 27, 2007

(51) Int. Cl.
*B64C 3/54* (2006.01)
*G05D 1/08* (2006.01)
(Continued)

(52) U.S. Cl.
CPC ........... *G05D 1/0858* (2013.01); *B64C 27/52* (2013.01); *B64C 29/0033* (2013.01)

(58) Field of Classification Search
CPC ....... B64C 13/16; B64C 13/18; B64C 11/303; B64C 11/34; B64C 13/00; B64C 13/24;
(Continued)

(56) References Cited

U.S. PATENT DOCUMENTS 3,065,929 A * 11/1962 Holland, Jr. ........ B64C 29/0033
244/12.4
3,106,369 A * 10/1963 Borst ............................ 244/7 R
(Continued)

FOREIGN PATENT DOCUMENTS

WO          01/88648 A2    11/2001

OTHER PUBLICATIONS

Canadian Intellectual Property Office, Office Action for Canadian counterpart patent application dated May 12, 2009, 3 pages.
(Continued)

*Primary Examiner* — Assres H Woldemaryam
(74) *Attorney, Agent, or Firm* — James E. Walton

(57) ABSTRACT

A method and apparatus provide for automatically controlling the flight of a tiltrotor aircraft while the aircraft is in flight that is at least partially rotor-borne. The method and apparatus provide for automatically tilting nacelles in response to a longitudinal-velocity control signal so as to produce a longitudinal thrust-vector component for controlling longitudinal velocity of the aircraft. Simultaneously, cyclic swashplate controls are automatically actuated so as to maintain the fuselage in a desired pitch attitude. The method and apparatus also provide for automatically actuating the cyclic swashplate controls for each rotor in response to a lateral-velocity control signal so as to produce a lateral thrust-vector component for controlling lateral velocity of the aircraft. Simultaneously, collective swashplate controls for each rotor are automatically actuated so as to maintain the fuselage in a desired roll attitude. The method and apparatus provide for yaw control through differential longitudinal thrust produced by tilting the nacelles.

6 Claims, 6 Drawing Sheets

(51) Int. Cl.
*B64C 27/52* (2006.01)
*B64C 29/00* (2006.01)

(58) Field of Classification Search
CPC ... B64C 13/38; B64C 13/50; B64C 2201/086; B64C 2201/088; B64C 2201/104; B64C 2201/146; B64C 2201/165; B64C 2201/187; B64C 27/57; B64C 29/0033
See application file for complete search history.

(56) References Cited

U.S. PATENT DOCUMENTS

| | | | | |
|---|---|---|---|---|
| 3,175,786 A | * | 3/1965 | Frank | G05D 1/0858 244/17.13 |
| 3,179,352 A | | 4/1965 | Nelson | |
| 3,181,810 A | * | 5/1965 | Olson | 244/7 R |
| 3,393,882 A | | 7/1968 | Soulez-Lariviere et al. | |
| 3,488,018 A | * | 1/1970 | Johnson | B64C 29/0033 244/12.4 |
| 3,514,052 A | | 5/1970 | McKeown | |
| 4,500,967 A | * | 2/1985 | Murphy et al. | 701/12 |
| 4,669,958 A | * | 6/1987 | Peyran et al. | 416/114 |
| 5,096,140 A | * | 3/1992 | Dornier et al. | 244/7 C |
| 5,141,176 A | | 8/1992 | Kress et al. | |
| 5,428,543 A | * | 6/1995 | Gold et al. | 701/5 |
| 5,511,947 A | * | 4/1996 | Schmuck | 416/131 |
| 6,367,736 B1 | * | 4/2002 | Pancotti | 244/7 R |
| 6,616,095 B2 | * | 9/2003 | Stamps et al. | 244/17.13 |
| 6,719,244 B1 | * | 4/2004 | Gress | B64C 29/0033 244/17.25 |

OTHER PUBLICATIONS

European Patent Office, Search Report for counterpart European Application No. 04786134 dated Sep. 25, 2009, 3 pages.
European Patent Office, Office Action for counterpart European Application No. 04786134 dated Feb. 24, 2009, 4 pages.
European Patent Office, Communication for counterpart European Application No. 04786134 dated Feb. 28, 2011, 4 pages.
European Patent Office, Extended European Search Report for counterpart European Application No. 12156728.3-2206 dated Jun. 18, 2012, 5 pages.
European Patent Office, Communication for counterpart European Application No. 04786134 dated Oct. 5, 2011, 7 pages.

* cited by examiner

METHOD AND APPARATUS FOR FLIGHT CONTROL OF TILTROTOR AIRCRAFT

TECHNICAL FIELD

The present invention relates in general to the field of flight control of aircraft. In particular, the present invention relates to apparatus and methods for controlling the flight of a tiltrotor aircraft.

DESCRIPTION OF THE PRIOR ART

A rotary wing aircraft, such as a helicopter or the tiltrotor aircraft 11 shown in FIG. 1, produces lift with at least one main rotor 13, which comprises multiple wings, or blades 15, attached to a rotating hub 17. Each blade 15 has an airfoil cross-section, and lift is produced by moving blades 15 in a circular path as hub 17 rotates. As shown in the figures, the left and right sides of aircraft 11 are generally mirror images of each other, having corresponding components on each side of aircraft 11. As described herein, a single reference number may be used to refer to both left and right (as viewed if seated in the aircraft) components when the description applies to both components. Specific reference numbers are used for clarity to refer to specific left or right components when the description is specific to either the left or right component. For example, "rotor 13" may be used in descriptions of both the left rotor and the right rotor, and "rotor 13A" and "rotor 13B" may be used in descriptions that are specific to the left and right rotors, respectively.

The amount of lift produced can be varied by changing the angle of attack, or pitch, of blades 15 or the speed of blades 15, though the speed of rotor 13 is usually controlled by use of a RPM governor to within a narrow range for optimizing performance. Varying the pitch for each blade 15 requires a complex mechanical system, which is typically accomplished using a swashplate assembly (not shown) located on each hub 17.

Each swashplate assembly has two primary roles: (1) under the direction of the collective control, each swashplate assembly changes the pitch of blades 15 on the corresponding rotor 13 simultaneously, which increases or decreases the lift that each rotor 13 supplies to aircraft 11, increasing or decreasing each thrust vector 19 for causing aircraft 11 to gain or lose altitude; and (2) under the direction of the cyclic control, each swashplate assembly changes the angle of blades 15 on the corresponding rotor 13 individually as they move with hub 17, creating a moment in a generally horizontal direction, as indicated by arrows 21, for causing aircraft 11 to move in any direction around a horizontal 360-degree circle, including forward, backward, left and right.

Typically, the collective blade pitch is controlled by a lever that the pilot can move up or down, whereas the cyclic blade pitch is controlled by a control stick that the pilot moves in the direction of desired movement of the aircraft. The collective control raises the entire swashplate assembly as a unit, changing the pitch of blades 15 by the same amount throughout the rotation of hub 17. The cyclic control tilts the swashplate assembly, causing the angle of attack of blades 15 to vary as hub 17 rotates. This has the effect of changing the pitch of blades 15 unevenly depending on where they are in the rotation, causing blades 15 to have a greater angle of attack, and therefore more lift, on one side of the rotation, and a lesser angle of attack, and therefore less lift, on the opposite side of the rotation. The unbalanced lift creates a moment that causes the pitch or roll attitude of aircraft 11 to change, which rotates the thrust vectors and causes aircraft 11 to move longitudinally or laterally.

A tiltrotor aircraft, such as aircraft 11, also has movable nacelles 23 that are mounted to the outer ends of each fixed wing 25. Nacelles 23 can be selectively rotated, as indicated by arrows 27, to any point between a generally vertical orientation, as is shown in FIG. 1, corresponding to a "helicopter mode" for rotor-borne flight using blades 15 to provide lift, and a horizontal orientation, corresponding to an "airplane mode" for forward flight using fixed wings 25 to produce lift. Aircraft 11 may also operate in partial helicopter mode at low speeds, in which rotors 13 and fixed wings 25 both provide part of the required lift for flight. The operation of aircraft 11 typically includes a vertical or short takeoff, a transition from helicopter mode to airplane mode for forward flight, and then a transition back to helicopter mode for a vertical or short landing.

Due to the many variables involved in the control of flight of a tiltrotor aircraft, a computer-controlled flight control system (FCS) 28 automates many of the functions required for safe, efficient operation. FCS 28 actuates flight-control components of aircraft 11 in response to control inputs generated by one or more of the following: (1) an on-board pilot; (2) a pilot located remote from the aircraft, as with an unmanned aerial vehicle (UAV); (3) a partially autonomous system, such as an auto-pilot; and (4) a fully autonomous system, such as in an UAV operating in a fully autonomous manner. FCS 28 is provided with software-implemented flight control methods for generating responses to these control inputs that are appropriate to a particular flight regime.

In the automatic control methods of current tiltrotor aircraft, when a command for a change in longitudinal velocity is received by FCS 28 while aircraft 11 is in full or partial helicopter mode, FCS 28 induces longitudinal acceleration of aircraft 11 by changing the pitch attitude of aircraft 11 to direct thrust vectors 19 forward or rearward. The change of pitch attitude is accomplished by FCS 28 commanding the swashplates to tilt forward or rearward using cyclic control, which causes aircraft 11 to pitch downward in the direction that the aircraft is commanded to fly. For example, when aircraft 11 is commanded by a pilot to fly in the forward direction by moving the cyclic control forward, FCS 28 commands the swashplate for each rotor 13 to tilt forward, and rotors 13 create a forward pitch moment. As shown in FIG. 2, the moment causes the plane of blades 15 to tilt forward and also pitches aircraft 11 in the nose-down direction, which is visible in comparison to ground 29. Thrust vectors 19 are thus rotated toward the forward direction, and the result is movement in the direction shown by arrow 30.

There are several undesirable influences on aircraft 11 using this flight control method, especially in a gusty or windy environment. When the pitch attitude of aircraft 11 is changed due to a command to move in the forward/rearward direction, there is a change in the angle of attack of wings 25 and a corresponding reduction in lift produced by wings 25, and this may produce an undesirable change in the vertical velocity and/or altitude of aircraft 11, which must be countered by changing the vertical climb command. This pitch-attitude-to-vertical-velocity coupling is especially true when hovering or in a low-speed flight condition, and is more pronounced in the presence of a headwind. Using the current automatic flight control method in this situation, aircraft 11 cannot accelerate in the forward direction without a nose-down pitch attitude, and the resulting uncommanded and unwanted vertical motion interferes with the precise vertical control of aircraft 11.

In the automatic control methods of current tiltrotor aircraft, when a command for a change in lateral velocity is received by FCS 28 while the aircraft is in full or partial helicopter mode, FCS 28 induces lateral acceleration of aircraft 11 by changing the roll attitude of aircraft 11 to direct thrust vectors 19 to the left or right. This is accomplished using differential collective blade pitch control, which causes fuselage 23 to tilt right or left in the direction that aircraft 11 is commanded to fly. For example, when aircraft 11 is commanded to fly to the right, FCS 28 commands the collective controls on rotors 13 such that right rotor 13 produces less lift than that being produced by left rotor 13. The resulting thrust imbalance causes aircraft 11 to roll to the right, as shown in FIG. 3, directing thrust vectors 19 to the right and causing aircraft 11 to move in the direction of arrow 31.

This automatic flight control method of tilting aircraft 11 during lateral maneuvering also causes several problems. When aircraft 11 is operating in the area of ground effects, which it must do each time it is in close proximity to a large surface, such as ground 29 during takeoff and landing, the rolling of aircraft 11 will cause one rotor 13 to be closer to ground 29 than the other rotor 13. This difference in relation to ground 29 will cause the ground effects to be greater on one side of aircraft 11 than on the other, which will cause the lift of each rotor 13 to change differently. This difference will cause an additional roll moment on aircraft 11, and this interferes with the precise control of aircraft 11. The rolling of aircraft 11 also tends to blow the air cushion out from under one side of aircraft 11, further degrading the controllability.

When aircraft 11 is moving laterally, or is hovering in a sideward wind, and wings 25 are tilted to the left or right, there is more drag or wind resistance. There is also an increase in down loading, which is the loading of the top of wings 25 by the dynamic pressure caused by rotors 13 and the lateral aircraft velocity. Both of these conditions degrade the controllability in the lateral and vertical axes and require more power than flying level in the same wind conditions.

Aircraft 11 is also subject to upsets from wind gusts, with wind from any direction causing large position displacements when using the current control methods. For example, if aircraft 11 experiences a wind gust from the left side, aircraft 11 will roll to the right. When aircraft 11 rolls to the right, thrust vectors 19 are also rotated to the right, which makes the lateral velocity of aircraft 11 increase to the right. In current tiltrotor aircraft, if FCS 28 is programmed to hold the aircraft over a specified point on the ground, FCS 28 will command aircraft 11 to roll back to the left, causing thrust vectors 19 to oppose the gust and to move aircraft 11 back to the position it occupied before the gust. This method of control has the disadvantage of allowing the gust to displace aircraft 11 a significant distance from its original position before FCS 28 can drive aircraft 11 back to the original position.

Other problems with the current methods of control include high response time to FCS commands and reduced passenger comfort. Response time to forward and lateral velocity commands is high due to the requirement that the attitude of aircraft 11 change for these commands to be executed, and the high inertia of a large, manned tiltrotor, such as aircraft 11, translates into low response frequencies of the system. A significant disadvantage for tiltrotors used to carry passengers is that passenger comfort is compromised by tilting fuselage 23 of aircraft 11 while maneuvering while hovering or in low-speed flight, such as while approaching for a landing and when moving aircraft 11 into position to accelerate to forward flight.

In the automatic control methods of current tiltrotor aircraft, when a command to change the yaw velocity (i.e., the velocity of change of heading) of aircraft 11 is received by FCS 28 while the aircraft is in full or partial helicopter mode, FCS 28 induces a yawing moment using differential longitudinal cyclic control. For example, when aircraft 11 is commanded to yaw to the left, such as when a pilot depresses the left rudder pedal, FCS 28 commands the swashplate for right rotor 13B to tilt forward and commands the swashplate of left rotor 13A to tilt rearward. As shown in FIG. 4, the planes of blades 15A and 15B and the direction of thrust vectors 19A, 19B are tilted in opposite directions, with vector 19A having a rearward thrust component and vector 19B having forward thrust component. Thrust vectors 19A, 19B create a yaw moment, resulting in rotation of aircraft 11 generally about a vertical yaw axis 32 in the direction shown by arrow 33.

SUMMARY OF THE INVENTION

There is a need for an improved apparatus and improved methods for controlling tiltrotor aircraft with minimized tilting of the fuselage of the aircraft and enhanced accuracy of control.

Therefore, it is an object of the present invention to provide an improved apparatus and improved methods for controlling tiltrotor aircraft.

The present invention provides a flight control system (FCS) implementing the control methods of the invention for automatic flight control of a tiltrotor aircraft while operating at low airspeeds or in a hover, especially during operation in gusty and turbulent wind conditions. In response to a control input for a change in longitudinal velocity, such as a pilot pushing forward on the cyclic control, the FCS commands the nacelles to rotate in the same direction for directing thrust vectors of the rotors in a longitudinal direction. Simultaneously, the FCS automatically holds the fuselage at a desired pitch attitude by use of the longitudinal cyclic swashplate controls.

In response to a control input for a change in lateral velocity, such as a pilot pushing sideways on the cyclic control, the FCS commands the lateral cyclic swashplate controls for directing thrust vectors of the rotors in a lateral direction. Simultaneously, the FCS automatically holds the fuselage to a desired roll attitude by differential use of rotor collective controls.

In response to a control input for a change of yaw velocity, such as a pilot depressing a rudder pedal, the FCS commands the nacelles to rotate for directing thrust vectors of the rotors in different directions, creating a moment that causes the aircraft to yaw.

The present invention provides significant advantages over the prior art, including: (1) providing longitudinal and lateral velocity control while maintaining the fuselage in a desired attitude; (2) reducing response time to forward and lateral velocity commands; (3) increasing accuracy of aircraft control; (4) reducing position displacements caused by wind gusts; (5) reducing the pitch-attitude to vertical-velocity coupling; (6) reducing the responses to ground effects; and (7) reducing the power required for lateral flight.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

Figure 1:
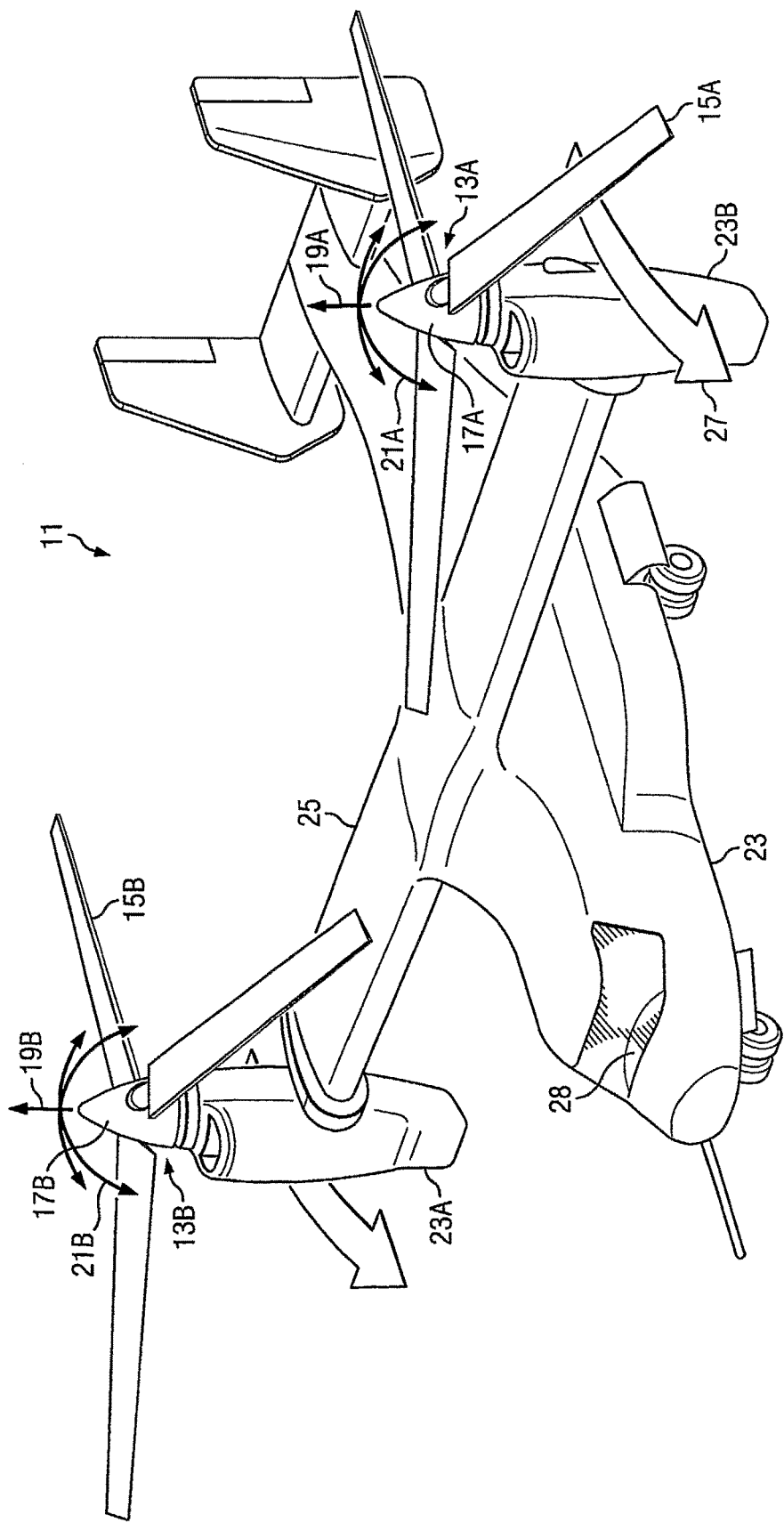
FIG. 1 is a perspective view of a prior-art tiltrotor aircraft.
Figure 2:
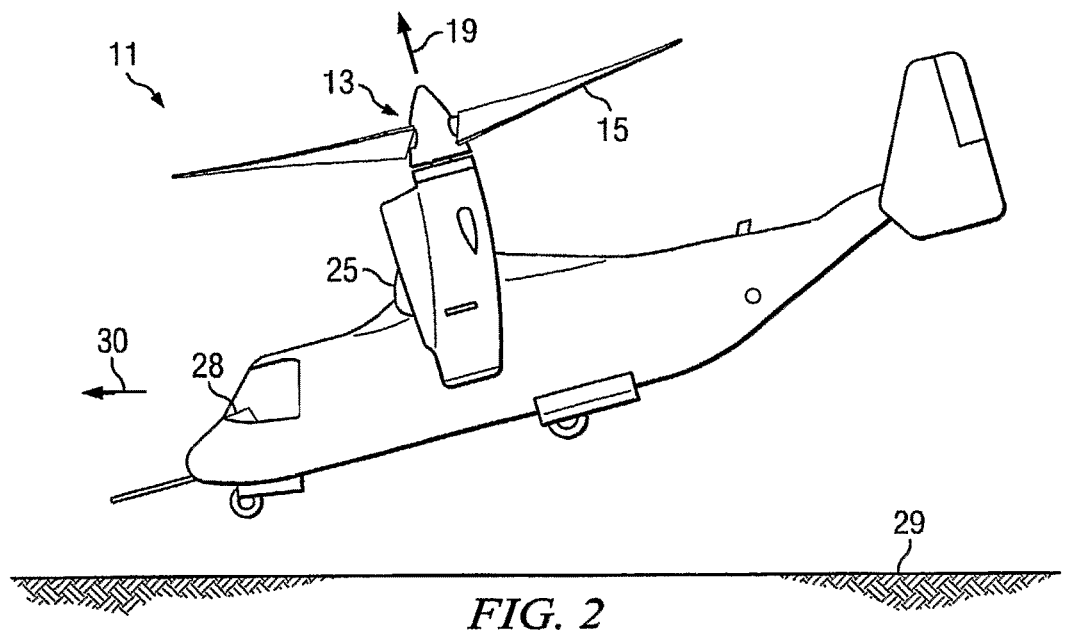
FIG. 2 is a side view of the tiltrotor aircraft of FIG. 1 executing a command to fly forward using a prior-art control method.
Figure 3:
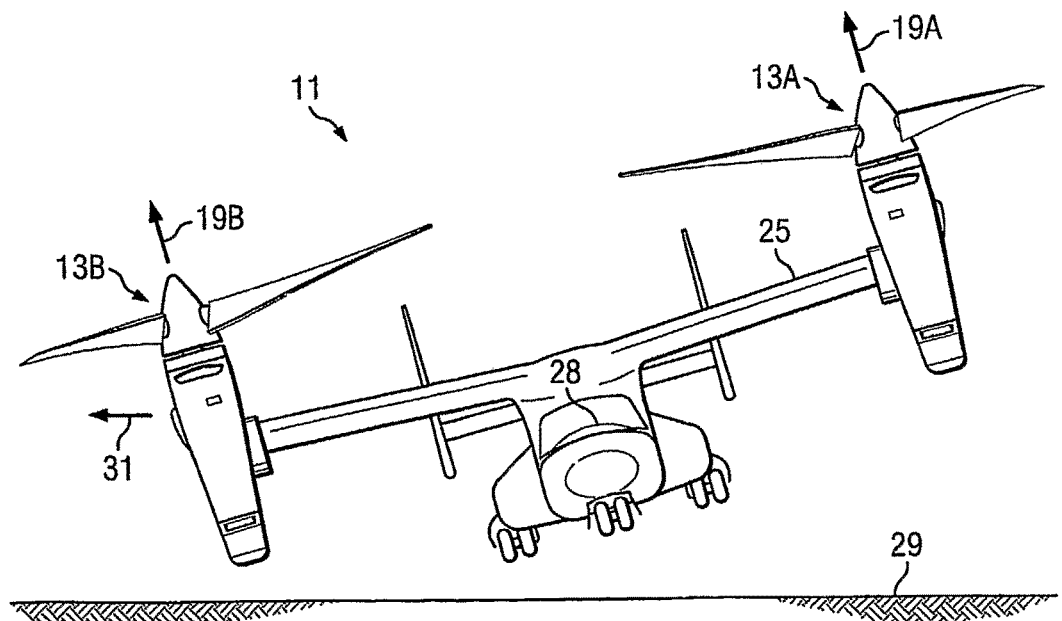
FIG. 3 is a front view of the tiltrotor aircraft of FIG. 1 executing a command to fly to the right using a prior-art control method.
Figure 4:
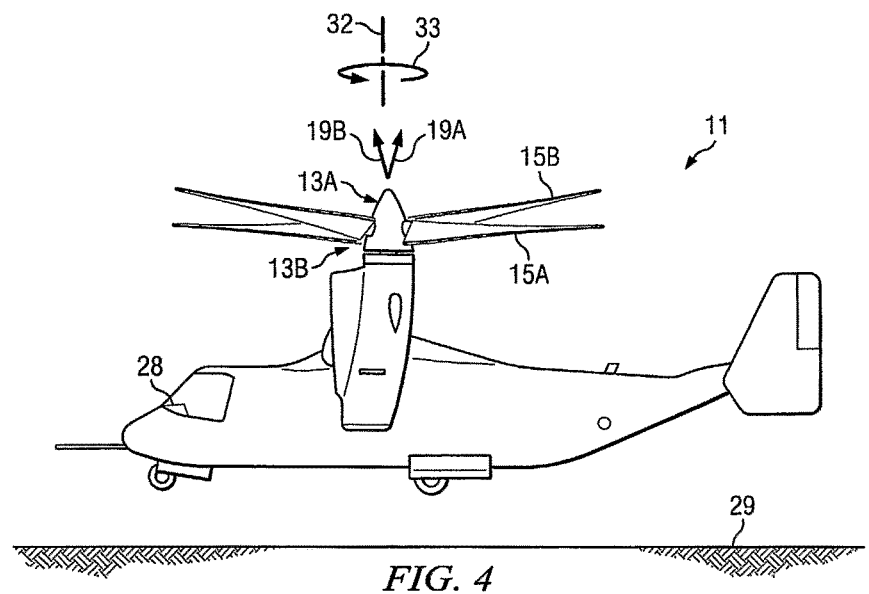
FIG. 4 is a side view of the tiltrotor aircraft of FIG. 1 executing a command to yaw to the left using a prior-art control method.
Figure 5:
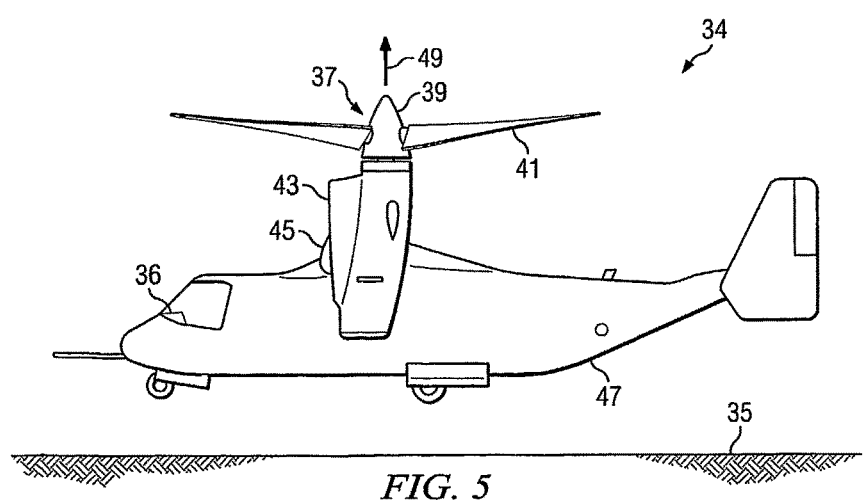
FIG. 5 is a side view of a tiltrotor aircraft using apparatus and control methods according to the present invention to maintain position in a hover.

Referring now to FIG. 5, a tiltrotor aircraft 34 is depicted in a hover above ground 35. Aircraft 34 is constructed in the same manner as aircraft 11, described above, but the flight control system (FCS) 36 in aircraft 34 uses the control methods of the present invention to automatically control the flight of aircraft 34 in response to control inputs by a pilot or electronic system. Rotors 37, comprising hub 39 and multiple blades 41, are powered by engines carried within nacelles 43. Nacelles 43 are rotatably mounted to the outer ends of wings 45, and wings 45 are affixed to fuselage 47. As described above, the pitch of each blade 41 is controlled by collective and cyclic swashplate controls (not shown) located within hub 39. As described herein, a single reference number may be used to refer to both left and right components (as viewed when seated in the aircraft) when the description applies to both components. Specific reference numbers are used for clarity to refer to specific left or right components when the description is specific to either the left or right component.

Figure 6:
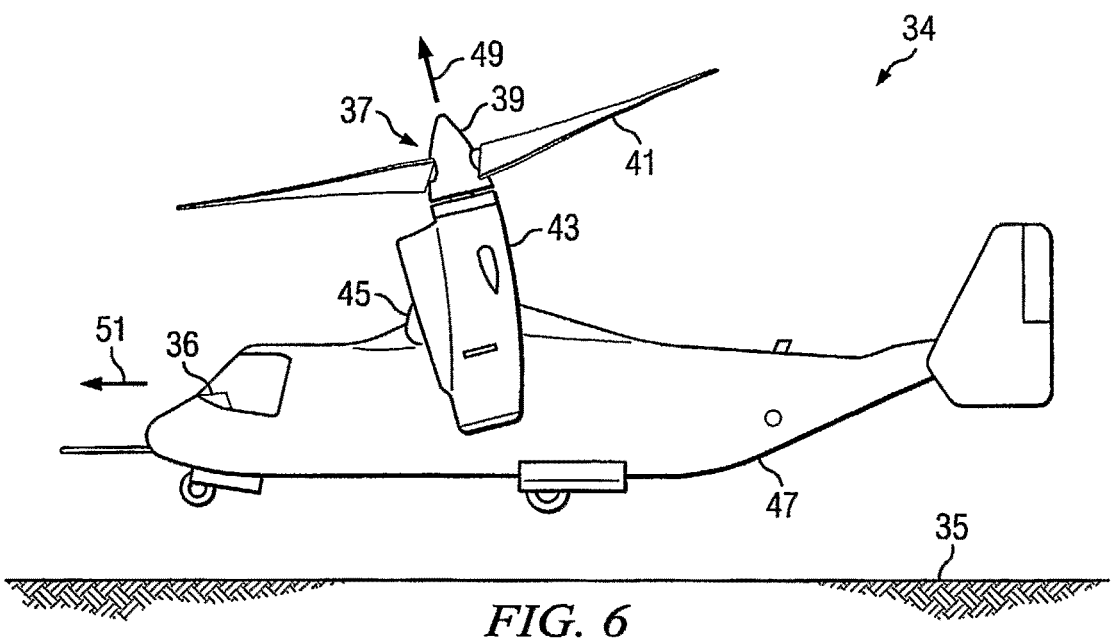
FIG. 6 is a side view of the tiltrotor aircraft of FIG. 4 executing a command to fly forward using a control method according to the present invention.

In the method of the present invention, a control input for a change in longitudinal velocity, such as a pilot pushing forward or pulling rearward on the cyclic control, causes FCS 36 to command nacelles 43 to rotate in the same direction for directing thrust vectors 49 of rotors 37 in a longitudinal direction. Simultaneously, FCS 36 automatically holds the pitch attitude of fuselage 47 to a desired pitch attitude, which may be a generally level pitch attitude, by use of the longitudinal cyclic swashplate controls. For example, FIG. 6 shows aircraft 34 configured for forward motion, with nacelles 43 tilted forward to give each thrust vector 49 a forward vector component. These components tends to drive aircraft 34 forward in the direction shown by arrow 51, while the swashplate controls in each rotor 37 are used to control the pitch attitude of fuselage 47. In addition to a response to a control input, FCS 36 can generate commands in response to a longitudinal position error, in which nacelles 43 are commanded so as to return aircraft 34 to a previous position or to fly to a selected position.

This longitudinal velocity control method differs from the prior-art control method in that change of the pitch attitude of fuselage 47 is not required to change the longitudinal velocity of aircraft 34. Maintaining a generally level pitch attitude prevents the angle of attack for wings 45 from changing and prevents the undesirable change in vertical forces that cause problems in controlling the vertical aircraft position using the prior-art control methods. Specifically, when hovering or in a low-speed flight condition, especially in the presence of a headwind, the longitudinal velocity control method of the present invention will reduce the pitch-attitude to vertical-velocity coupling by allowing aircraft 34 to accelerate in the forward direction without a nose-down pitch attitude. In addition, the method of the present invention allows the attitude of aircraft 34 to be controlled to the most favorable condition during the conversion from helicopter mode to airplane mode.

Figure 7:
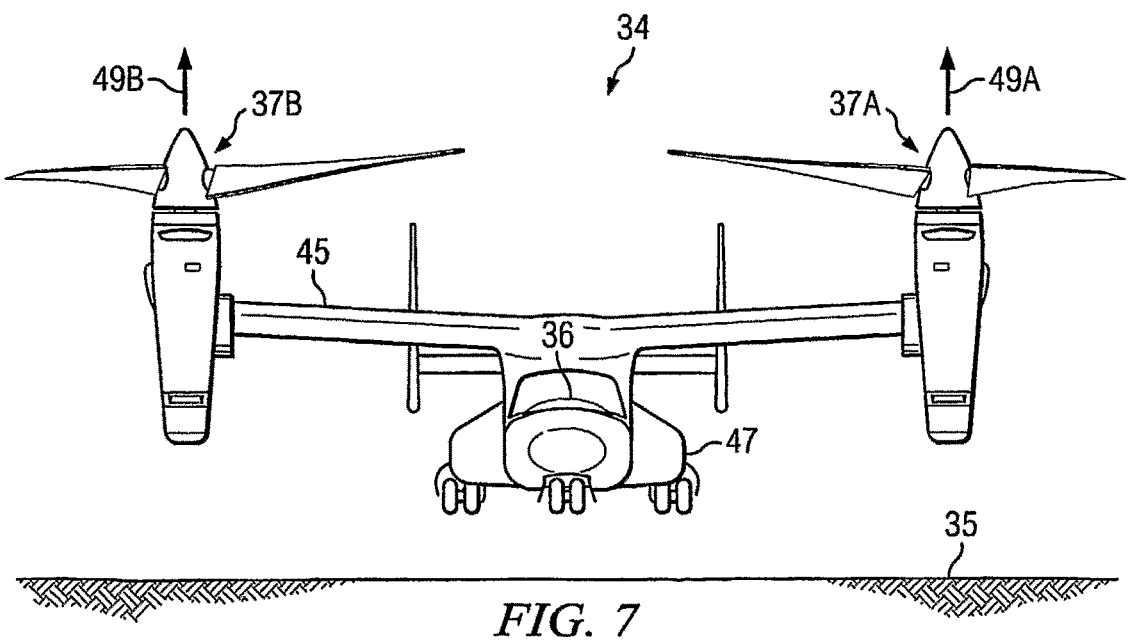
FIG. 7 is a front view of the tiltrotor aircraft of FIG. 4 using a control method according to the present invention to maintain position in a hover.

The control methods of the present invention also include an improved method of lateral velocity control of aircraft 34, the method being implemented in FCS 36. Aircraft 34 is shown in a hover above ground 35 in FIG. 7, with the left rotor labeled as 37A and the right rotor labeled as 37B. Each rotor 37A, 37B produces a vertical thrust vector 49A, 49B, respectively, for lifting aircraft 34. In response to a control input for a change in lateral velocity, such as a pilot pushing sideways on the cyclic control, FCS 36 commands the lateral cyclic swashplate controls for directing thrust vectors 49A, 49B of rotors 37A, 37B in a lateral direction. Simultaneously, FCS 36 automatically holds the roll attitude of fuselage 47 in a desired roll attitude, which may be a generally level roll attitude, by differential use of rotor collective controls. In addition to a response to a control input, FCS 36 can generate commands in response to a lateral position error, in which the lateral cyclic swashplate controls are commanded so as to return aircraft 34 to a previous position or to fly to a selected position.

Figure 8:
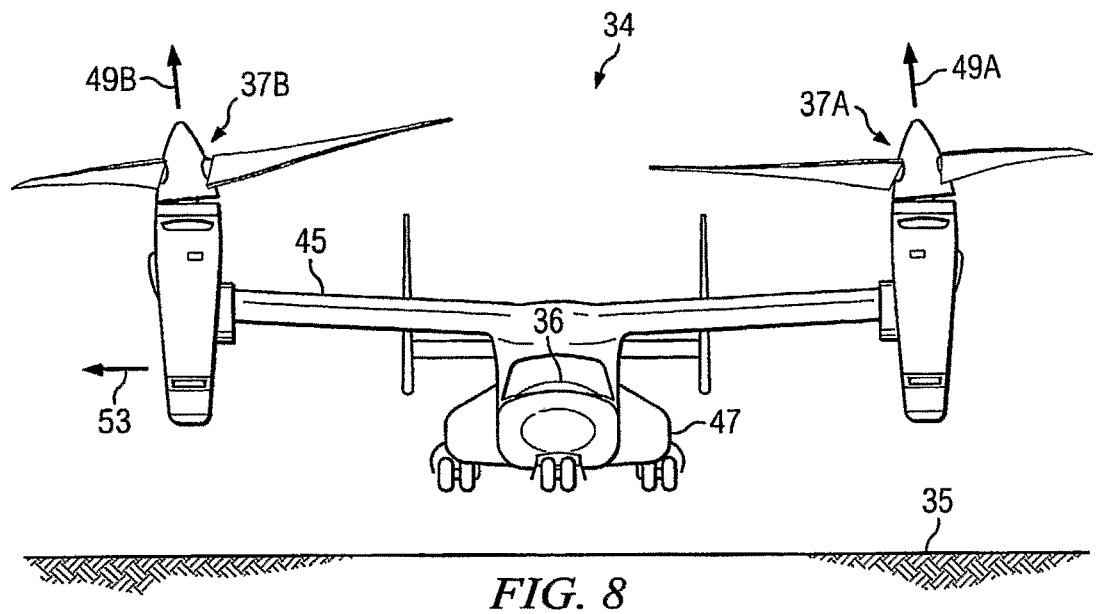
FIG. 8 is a front view of the tiltrotor aircraft of FIG. 4 executing a command to fly to the right using a control method according to the present invention.

For example, FIG. 8 shows aircraft configured for movement to the right (as viewed if seated in the aircraft). When command to move to the right, swashplate controls tilt the plane of rotors 37A, 37B to the right, causing thrust vectors 49A, 49B to have a horizontal component to the right, and this vector component causes aircraft 34 to move in the direction shown by arrow 53. While the cyclic swashplate controls induce sideward movement, the differential collective blade control is used to hold the aircraft level, meaning that the collective controls for rotors 37A, 37B are actuated independently from each other to maintain the desired fuselage attitude. This combination of controls allows aircraft 34 to move laterally in a stable and precise manner while holding aircraft 34 in a level roll attitude. A key advantage to the control method of the present invention is that holding fuselage 47 in a level attitude during lateral flight minimizes ground-effect problems and wing downloading problems encountered when rolling aircraft 34 using the prior-art method.

Additionally, the lateral velocity control method of the invention provides for improved lateral gust response, which may be reduced by as much as around 80%. When a lateral gust hits aircraft 34, FCS 36 will immediately command the lateral cyclic swashplate control in the direction opposing the gust while the differential collective blade control is commanded to hold aircraft 34 level. Aircraft 34 will still have a tendency to roll with the gust, but thrust vectors 49A, 49B can quickly be redirected to oppose the gust without the need to roll aircraft 34 beyond the amount required to bring aircraft 34 back to a generally level roll attitude or other desired roll attitude. As described above, FCS 36 may also generate commands to the cyclic swashplate controls in response to a lateral position error for returning aircraft 34 to the position aircraft 34 occupied prior to the displacement caused by the gust.

The swashplate cyclic controls are limited by physical constraints and the geometry of the system, such that there is a limited amount of total cyclic allowed for all cyclic command inputs. The total cyclic used at any one time is the square root of the sum of the squares of the longitudinal cyclic and the lateral cyclic. As described above, the methods of the invention include using longitudinal cyclic controls for controlling the aircraft pitch attitude and using lateral cyclic controls for controlling the lateral velocity of the aircraft. Longitudinal cyclic is also required to control the aircraft pitch moment as the location of the center of gravity of aircraft 34 changes. To reduce the total cyclic swashplate commands, the present invention also includes a control method for controlling yaw in aircraft 34 without the requirement of using longitudinal cyclic controls.

Figure 9:
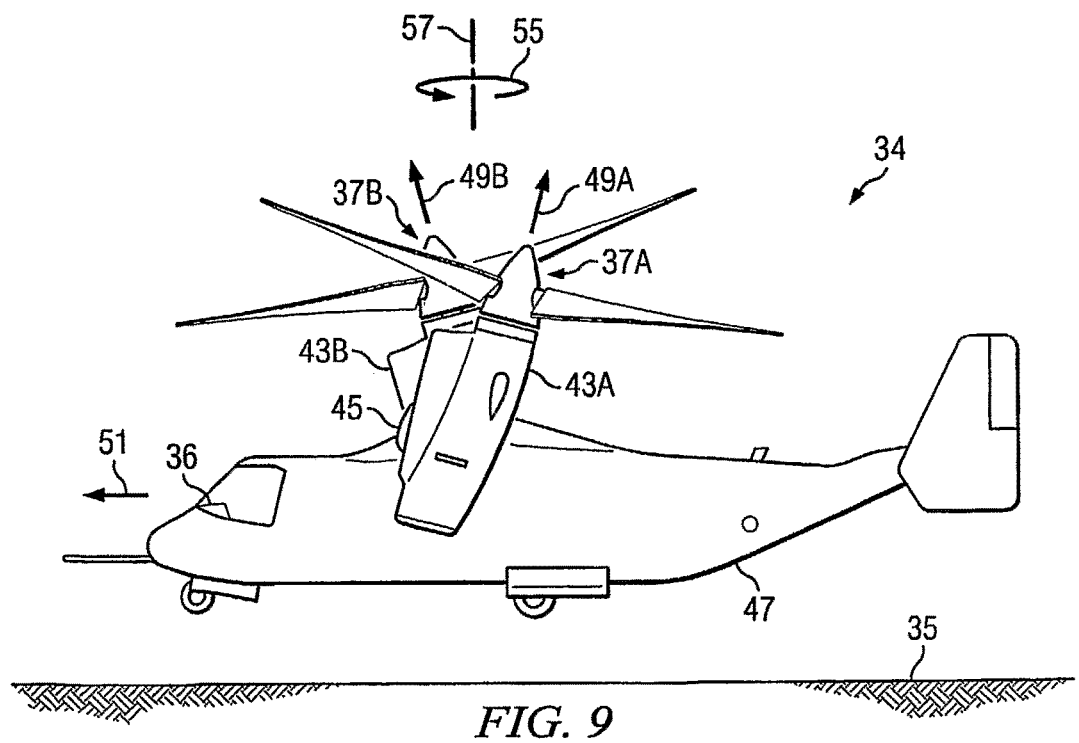
FIG. 9 is a side view of the tiltrotor aircraft of FIG. 4 executing a command to yaw to the left using a control method according to the present invention.

The yaw control method provides for differential nacelle control, in which nacelles 43 of aircraft 34 are rotated independently to direct their thrust vectors 49 in different directions, creating a yaw moment. For example, FIG. 9 shows aircraft 34 configured for yawing in a direction with the nose of aircraft 34 moving to the left (as viewed if seated in the aircraft). Left nacelle 43A has been rotated rearward, and right nacelle 43B has been rotated forward, directing thrust vectors 49A and 49B in different directions. Thrust vector 49A has a longitudinal thrust component pointing toward the rear of aircraft 34, and thrust vector 49B has a longitudinal thrust component pointing toward the front of aircraft 34. This longitudinal thrust differential creates a yaw moment, causing aircraft 34 to rotate in the direction of arrow 55 about a yaw axis 57. An advantage of this yaw control method is that removing the yaw control commands from the total cyclic commands provides for more cyclic control range to be available for control of pitch attitude, center-of-gravity changes, and lateral aircraft velocity control. This allows for increased longitudinal center-of-gravity range, increased capability to hover in a crosswind, increased maneuver envelope for the pitch, roll, and yaw axes, reduced rotor flapping, and simplified prioritization of cyclic commands. Also, the yaw control is not limited by cyclic authority limits.

Figure 10:
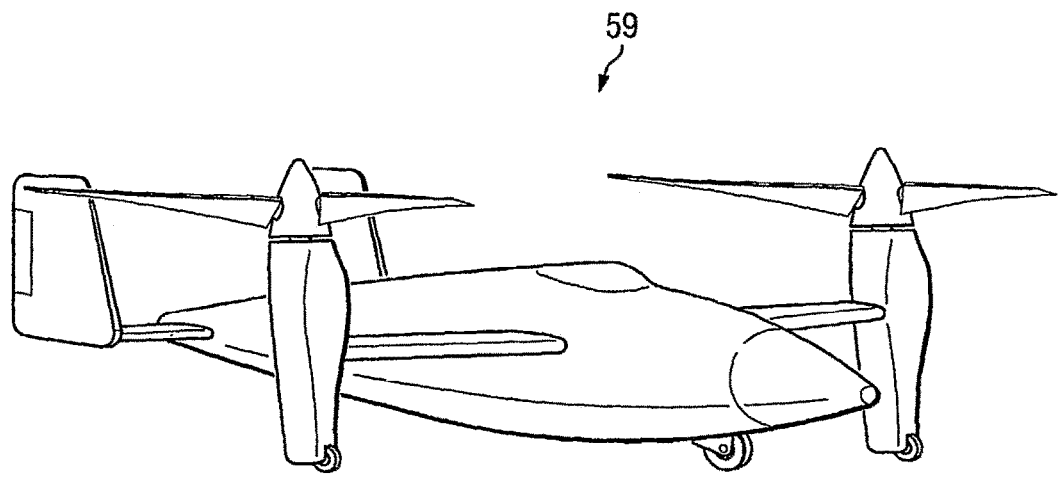
FIG. 10 is a perspective view of an unmanned tiltrotor aircraft according to the present invention.

While shown in FIGS. 5-9 as used with a manned, military-style aircraft 34, the improved FCS and control methods of the present invention may also be applied to control any type of tiltrotor aircraft. FIG. 10 shows an unmanned aerial vehicle 59 (UAV) constructed as a tiltrotor aircraft. The enhanced accuracy of control permitted by the methods of the present invention is especially beneficial with the remote and often automated operation of UAVs. Specific functions that are enabled or enhanced include automatic launch and automatic recovery from a secondary vehicle, such as from the deck of a ship at sea, and maneuvering around a particular location or target in windy conditions with the required accuracy. Also, the reduced response time to forward and lateral velocity commands provides for a greater maneuver bandwidth, which is a great advantage for automatically controlled aircraft.

Figure 11:
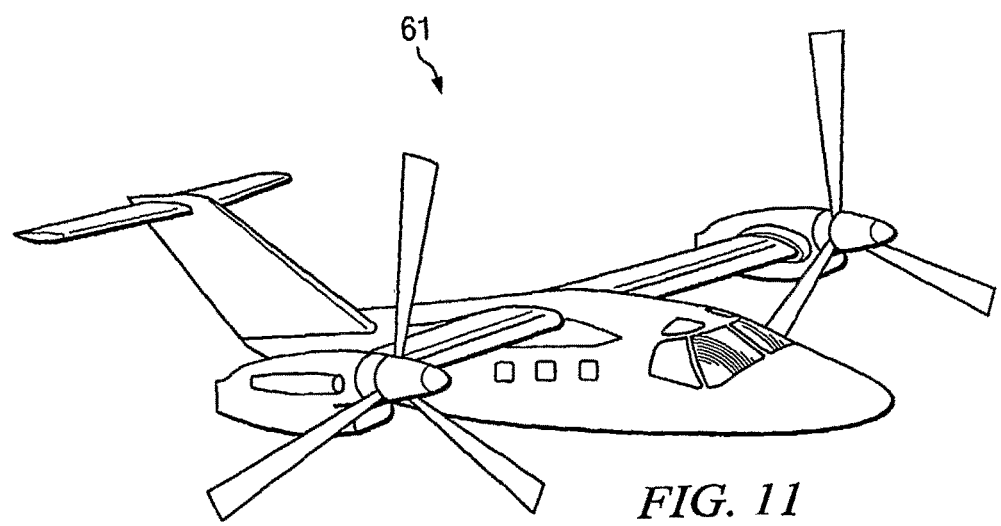
FIG. 11 is a perspective view of a civilian passenger version of a tiltrotor aircraft according to the present invention.

A civilian passenger version of a tiltrotor aircraft 61 is depicted in FIG. 11. As discussed above, the advantages realized from using the control methods of the invention include improved passenger comfort. By holding aircraft 61 in generally level pitch and roll attitudes while maneuvering in hover or low-speed flight, the passengers aboard aircraft 57 are not subjected to the tilting and associated change of relative direction of acceleration due to gravity, or g-forces, felt when using the prior-art methods of control.

The present invention provides significant advantages over the prior art, including: (1) providing longitudinal and lateral velocity control while maintaining the fuselage in a desired attitude; (2) reducing response time to forward and lateral velocity commands; (3) increasing accuracy of aircraft control; (4) reducing position displacements caused by wind gusts; (5) reducing the pitch-attitude to vertical-velocity coupling; (6) reducing the responses to ground effects; and (7) reducing the power required for lateral flight.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, it should be appreciated that these control methods may also be applicable to other tiltrotor aircraft, such as a Quad tiltrotor aircraft having four nacelles.

The invention claimed is:

1. A method for automatically controlling the flight of a tiltrotor aircraft while the aircraft is in flight that is at least partially rotor-borne, the tiltrotor aircraft being capable of flying in a helicopter mode and in an airplane mode, the aircraft having a fuselage and at least two tiltable nacelles, each nacelle having a rotor with adjustable-pitch blades controlled by cyclic swashplate controls and collective swashplate controls, the method comprising the steps of:

providing a flight control system;

providing longitudinal swashplate controls in each nacelle;

providing lateral swashplate controls in each nacelle;

operating the tiltrotor aircraft in the helicopter flight mode while the fuselage is positioned at a level pitch attitude;

generating a longitudinal-velocity control signal based on a pilot control input for generating a longitudinal velocity while maintaining the aircraft in the helicopter flight mode;

automatically tilting the nacelles with the flight control system in response to the longitudinal-velocity control signal so as to produce a longitudinal thrust-vector component for controlling longitudinal velocity of the aircraft;

automatically actuating the longitudinal cyclic swashplate controls for each rotor with the flight control system so as to maintain the fuselage in the level pitch attitude; and maintaining the fuselage in the level pitch attitude;

wherein each nacelle is independently tiltable;

wherein the automatically actuating the longitudinal cyclic swashplate controls for each rotor counteracts a changing in pitch attitude that would otherwise result from tilting the nacelles; and wherein the counteracting the changing in pitch attitude occurs simultaneously with the automatically tilting the nacelles.

2. The method according to claim 1, further comprising the steps of:
provproviding collective swashplate controls in each nacelle;
generating a lateral-velocity control signal;
automatically actuating the lateral cyclic swashplate controls for each rotor with the flight control system in response to the lateral-velocity control signal so as to produce a lateral thrust-vector component for controlling lateral velocity of the aircraft; and
automatically actuating the collective swashplate controls for each rotor with the flight control system so as to maintain the fuselage in a level roll attitude;
wherein the collective swashplate controls for each rotor are actuated independently from each other.

3. A method for automatically controlling the flight of a tiltrotor aircraft while the aircraft is in flight that is at least partially rotor-borne, the tiltrotor aircraft being capable of flying in a helicopter mode and in an airplane mode, the aircraft having a fuselage and at least two tiltable nacelles, each nacelle having a rotor with adjustable-pitch blades controlled by cyclic swashplate controls and collective swashplate controls, the method comprising the steps of:
providing a flight control system;
providing longitudinal swashplate controls in each nacelle;
providing lateral swashplate controls in each nacelle;
operating the tiltrotor aircraft in the helicopter flight mode while the fuselage is positioned at a level roll attitude;
generating a lateral-velocity control signal based on a pilot control input for generating a lateral velocity while maintaining the aircraft in the helicopter flight mode;
automatically actuating the lateral cyclic swashplate controls for each rotor with the flight control system in response to the lateral-velocity control signal so as to produce a lateral thrust-vector component for controlling lateral velocity of the aircraft, thereby resulting in a changing in roll attitude of the fuselage from the level roll attitude; and
automatically differentially actuating the collective swashplate controls for each rotor with the flight control system in response to the lateral-velocity control signal so as to maintain the fuselage in the level roll attitude;
wherein the collective swashplate controls for each rotor are actuated independently from each other;
wherein each nacelle is independently tiltable from each other;
wherein the automatically differentially actuating the collective swashplate controls for each rotor prevents the changing in roll attitude of the fuselage; and
wherein the preventing the changing in roll attitude occurs simultaneously with the automatically actuating the lateral cyclic swashplate.

4. The method according to claim 3, further comprising the steps of:
generating a longitudinal-velocity control signal;
automatically tilting the nacelles with the flight control system in response to the longitudinal-velocity control signal so as to produce a longitudinal thrust-vector component for controlling longitudinal velocity of the aircraft; and
automatically actuating the longitudinal cyclic swashplate controls for each rotor with the flight control system so as to maintain the fuselage in a level pitch attitude.

5. A method for controlling a response of a tiltrotor aircraft to a wind gust while the aircraft is in flight that is at least partially rotor-borne, the tiltrotor aircraft being capable of flying in a helicopter mode and in an airplane mode, the aircraft having at least two tiltable nacelles, each nacelle having a rotor with adjustable-pitch blades controlled by cyclic swashplate controls and collective swashplate controls, the method comprising:
providing a flight control system;
providing longitudinal swashplate controls in each nacelle;
providing lateral swashplate controls in each nacelle;
operating the tiltrotor aircraft in the helicopter flight mode while the fuselage is positioned at a level pitch attitude and a level roll attitude;
automatically tilting the nacelles with the flight control system so as to produce a longitudinal thrust-vector component that opposes a longitudinal component of the wind gust while maintaining the aircraft in the helicopter flight mode;
automatically actuating the lateral cyclic swashplate controls for each rotor with the flight control system so as to produce a lateral thrust-vector component that opposes a lateral component of the wind gust and to maintain the fuselage in the level pitch attitude, thereby preventing a changing in pitch attitude of the fuselage that would otherwise result from the tilting the nacelles to produce the longitudinal thrust-vector component; and
automatically actuating the collective swashplate controls for each rotor with the flight control system so as to maintain the fuselage in the level roll attitude, thereby preventing a changing in roll attitude of the fuselage that would otherwise result from the actuating of the cyclic swashplate controls so as to produce the lateral thrust-vector component;
wherein each nacelle is independently tiltable;
wherein the wind gust is sufficient to positionally displace the tiltrotor aircraft;
wherein automatically tilting the nacelles reduces position displacement by the wind gust;
wherein automatically actuating the lateral cyclic swashplate controls reduces position displacement by the wind gust; and
wherein automatically actuating the collective swashplate controls reduces position displacement by the wind gust by differential collective control.

6. A method for automatically controlling the flight of a tiltrotor aircraft while the aircraft is in flight that is at least partially rotor-borne, the tiltrotor aircraft being capable of flying in a helicopter mode and in an airplane mode, the aircraft having only a first tiltable nacelle and a second tiltable nacelle both nacelles located on outer ends of a fixed wing, each nacelle having a rotor, the method comprising the steps of:
providing a flight control system having cyclic authority limits;
generating a yaw-control signal based upon on a pilot control input for generating a yaw moment while maintaining the aircraft in the helicopter flight mode;
automatically tilting the first tiltable nacelle and the second tiltable nacelle with the flight control system in response to the yaw-control signal so as to produce a longitudinal thrust differential between the rotors for controlling yaw velocity of the aircraft, the longitudinal thrust differential between the rotors being a result of the first tiltable nacelle being rotated toward a front of the aircraft with the second tiltable nacelle being rotated toward a rear of the aircraft; and wherein each nacelle is independently tiltable;
wherein the first nacelle and the second nacelle are on opposite sides of a longitudinal centerline of the fuselage; and
wherein the yaw-control signal is not limited by the cyclic authority limits.

* * * * *